(12) United States Patent
Chen

(10) Patent No.: US 8,930,585 B2
(45) Date of Patent: Jan. 6, 2015

(54) USB HOST CONTROLLER AND SCHEDULING METHODS THEREOF

(71) Applicant: MediaTek Inc., Hsin-Chu (TW)

(72) Inventor: Yu-Hsun Chen, Zhubei (TW)

(73) Assignee: MediaTek Inc., Hsin-Chu (TW)

( * ) Notice: Subject to any disclaimer, the term of this patent is extended or adjusted under 35 U.S.C. 154(b) by 0 days.

(21) Appl. No.: 13/888,608

(22) Filed: May 7, 2013

(65) Prior Publication Data

US 2013/0326091 A1 Dec. 5, 2013

Related U.S. Application Data

(60) Provisional application No. 61/652,555, filed on May 29, 2012.

(51) Int. Cl.
- *G06F 3/00* (2006.01)
- *G06F 9/00* (2006.01)
- *G06F 13/10* (2006.01)

(52) U.S. Cl.
CPC .................................. *G06F 13/105* (2013.01)
USPC ............. 710/8; 710/15; 710/19; 713/1; 713/2

(58) Field of Classification Search
None
See application file for complete search history.

(56) References Cited

U.S. PATENT DOCUMENTS

| | | | |
|---|---|---|---|
| 7,409,476 B1 * | 8/2008 | Liang et al. | 710/52 |
| 8,521,934 B1 * | 8/2013 | Ni | 710/113 |
| 2003/0177297 A1 * | 9/2003 | Hesse et al. | 710/305 |
| 2003/0225957 A1 * | 12/2003 | Hesse et al. | 710/313 |
| 2009/0006703 A1 * | 1/2009 | Fa et al. | 710/305 |
| 2009/0067441 A1 * | 3/2009 | Ansari et al. | 370/401 |
| 2009/0129389 A1 * | 5/2009 | DeFretay et al. | 370/392 |

\* cited by examiner

*Primary Examiner* — Michael Sun
(74) *Attorney, Agent, or Firm* — McClure, Qualey & Rodack, LLP

(57) ABSTRACT

A USB host controller is provided. The USB host controller includes an endpoint management unit, a transfer management unit, and a schedule management unit. The endpoint management unit manages endpoint configurations of a USB device, wherein the USB device includes a plurality of endpoints and the endpoint configurations include a plurality of statuses of the endpoints of the USB device. The transfer management unit transfers data regarding transfer information of the endpoints of the USB device between a system memory and the USB host controller. The schedule management unit simultaneously manages packet transfer of at least two endpoints of the USB device.

21 Claims, 10 Drawing Sheets

US 8,930,585 B2

USB HOST CONTROLLER AND SCHEDULING METHODS THEREOF

CROSS REFERENCE TO RELATED APPLICATIONS

This application claims the benefit of U.S. Provisional Application No. 61/652,555 filed May 29, 2012, the entirety of which is incorporated by reference herein.

BACKGROUND OF THE INVENTION

1. Field of the Invention

The disclosure relates to a Universal Serial Bus (USB) host controller, and more particularly to a scheduling method of a USB host controller.

2. Description of the Related Art

Universal Serial Bus (USB) is a serial bus standard for connecting an external apparatus, which has the capability to provide a hot plug, plug-and-play, and so on.

Currently, the USB 2.0 standard provides three transfer rates: low-speed, full-speed, and high-speed, which support data rates of 1.5 Mbps, 12 Mbps, and 480 Mbps, respectively. However, even faster transfer rates are being demanded for electronic apparatuses, due to increases in complex functions of the electronic apparatuses, so as to quickly access data from external apparatuses and subsequently perform related operations.

Therefore, the USB Implementers Forum established the next-generation USB industry standard, USB 3.0, to provide SuperSpeed data transfer and non-SuperSpeed (i.e. USB 2.0) data transfer simultaneously, wherein SuperSpeed data transfer supports a 5 Gbps data rate.

BRIEF SUMMARY OF THE INVENTION

A USB host controller and scheduling methods thereof are provided. An embodiment of a USB host controller is provided. The USB host controller comprises: an endpoint management unit, managing endpoint configurations of a USB device, wherein the USB device comprises a plurality of endpoints and the endpoint configurations comprise a plurality of statuses of the endpoints of the USB device; a transfer management unit, transferring data regarding transfer information of the endpoints of the USB device between a system memory and the USB host controller; and a schedule management unit, simultaneously managing packet transfer of at least two endpoints of the USB device.

Furthermore, an embodiment of a scheduling method for a USB host controller is provided, wherein the USB host controller is coupled to a USB device comprising a plurality of endpoints. Packet transfer of the endpoints of the USB device is managed by a schedule management unit. The step of managing the packet transfer of each endpoint of the USB device comprises six stages: obtaining status of one of the endpoints of the USB device; obtaining transfer information of the one of the endpoints of the USB device; transmitting a packet to the one of the endpoints of the USB device; obtaining a response from the one of the endpoints of the USB device; updating the transfer information of the one of the endpoints of the USB device; and updating the status of the one of the endpoints of the USB device. At least two stages of the six stages are simultaneously performed for different endpoints of the USB device.

Moreover, another embodiment of a scheduling method for a USB host controller, wherein the USB host controller is coupled to a USB device comprising a plurality of endpoints. Packet transfer of the endpoints of the USB device is managed by a schedule management unit. The step of managing the packet transfer of each endpoint of the USB device comprises six stages: obtaining status of the corresponding endpoint of the USB device; obtaining transfer information of the corresponding endpoint of the USB device; transmitting a packet to the corresponding endpoint of the USB device; obtaining a response from the corresponding endpoint of the USB device; updating the transfer information of the corresponding endpoint of the USB device; and updating the status of the corresponding endpoint of the USB device. At least two stages of the six stages are simultaneously performed for different packets of the corresponding endpoint of the USB device.

BRIEF DESCRIPTION OF THE DRAWINGS

The invention will become more fully understood by referring to the following detailed description with reference to the accompanying drawings, wherein.

DETAILED DESCRIPTION OF THE INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 1:
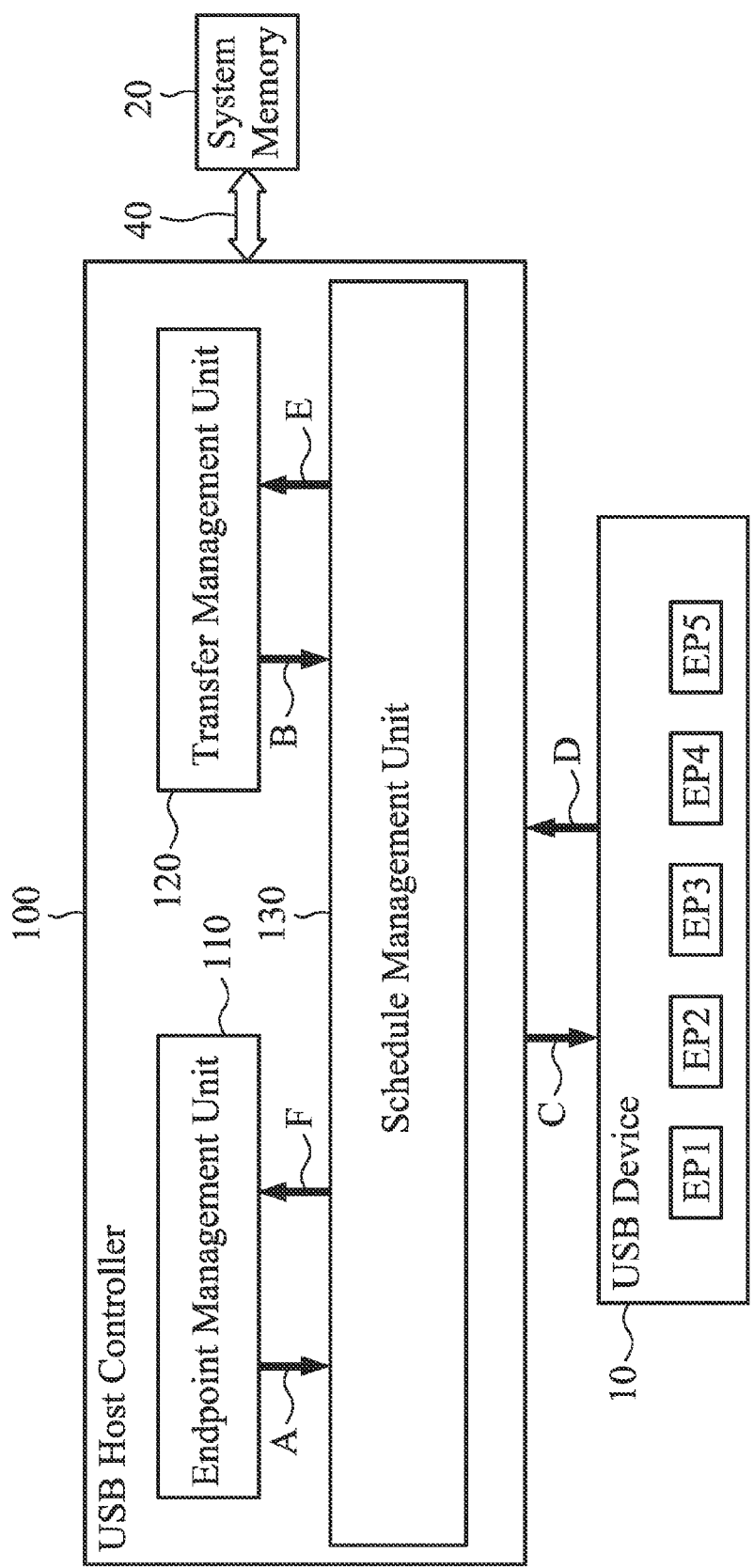
FIG. 1 shows a conventional Universal Serial Bus (USB) host controller.

FIG. 1 shows a conventional Universal Serial Bus (USB) host controller 100. The USB host controller 100 comprises an endpoint management unit 110, a transfer management unit 120 and a schedule management unit 130. The USB host controller 100 is coupled to a system memory 20 via an Extensible Host Controller Interface (xHCI) bus 40. Furthermore, the USB host controller 100 is coupled to a USB device 10 via a USB connection, wherein the USB device 10 comprises a plurality of endpoints EP1, EP2, EP3, EP4 and EPS, wherein each endpoint is a uniquely addressable portion of the USB device 10 that is the source or destination of information in a communication flow between the USB host controller 100 and the USB device 10. In the USB host controller 100, path A represents that the schedule management unit 130 obtains the status (e.g. 16-byte endpoint content) of an endpoint of the USB device 10 from the endpoint management unit 110 when the endpoint is activated. Next, path B represents that the schedule management unit 130 obtains transfer information (e.g. 16-byte queue descriptor and 1024-byte data content) corresponding to the endpoint from the transfer management unit 120. When the USB host controller 100 performs an OUT operation to store data to the USB device 10, path C represents that the schedule management unit 130 provides a packet (e.g. Data Packet Header (DPH) and Data Packet Payload (DPP)) corresponding to the transfer information and the packets corresponding to the data to be stored, to the USB device 10. Furthermore, when the USB host controller 100 performs the OUT operation, path D represents that the schedule management unit 130 obtains a response from the USB device 10, wherein the USB device 10 provides the response according to each packet from the USB host controller 100. On the other hand, when the USB host controller 100 performs an IN operation to read data stored in the USB device 10, path C represents that the schedule management unit 130 provides a packet (e.g. Data Packet Header (DPH) and Data Packet Payload (DPP)) corresponding to the transfer information to the USB device 10. Furthermore, when the USB host controller 100 performs the IN operation, path D represents that the schedule management unit 130 obtains a response and the packets corresponding to the stored data from the USB device 10, wherein the USB device 10 provides the response according to the packet from the USB host controller 100. Next, path E represents that the schedule management unit 130 updates the transfer information to the transfer management unit 120 according to the response from the USB device 10. Next, path F represents that the schedule management unit 130 updates the status of the endpoint of the USB device 10 to the endpoint management unit 110 in response to the updated transfer information.

Figure 2:
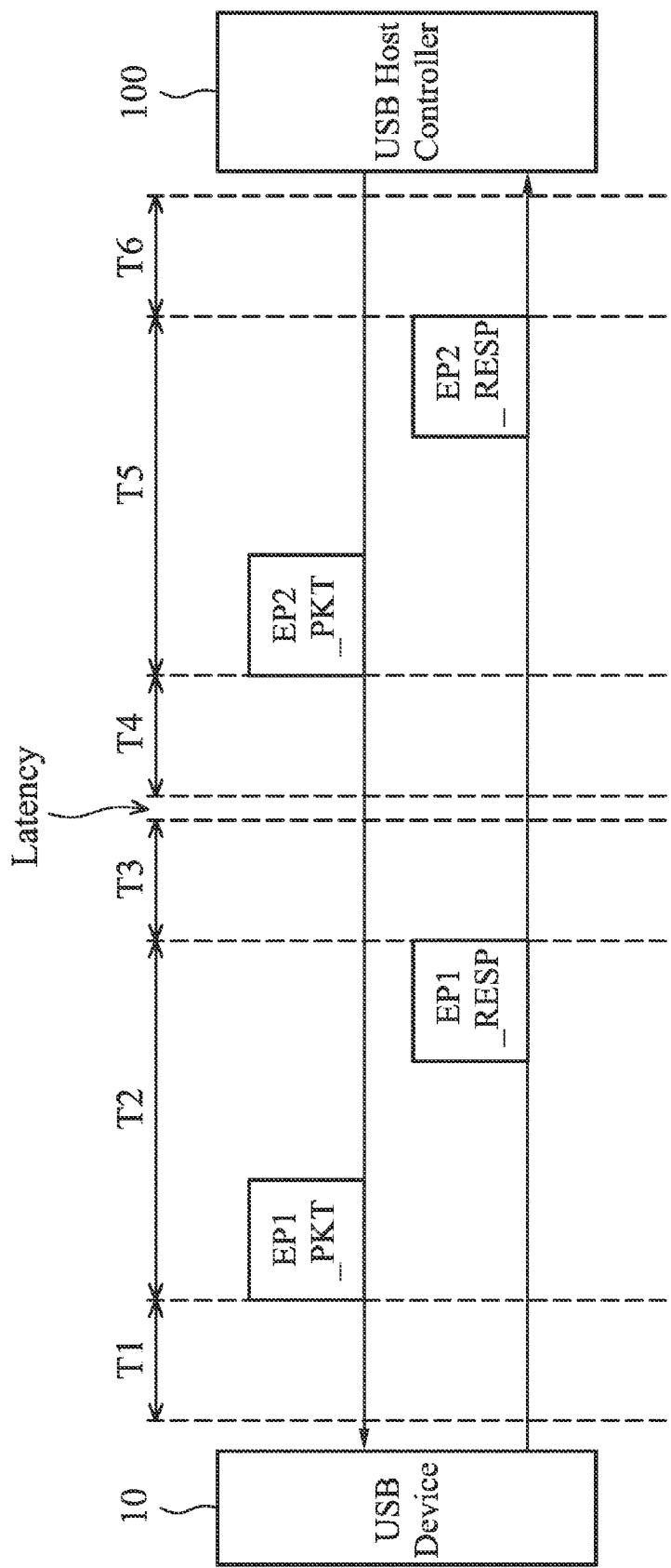
FIG. 2 shows a schematic illustrating data transfer between the USB host controller and the endpoints EP1 and EP2 of the USB device of FIG. 1.

FIG. 2 shows a schematic illustrating data transfer between the USB host controller 100 and the endpoints EP1 and EP2 of the USB device 10 of FIG. 1. Referring to FIG. 1 and FIG. 2 together, in time period T1, a procedure of the endpoint EP1 of the USB device 10 is activated, and the schedule management unit 130 obtains the status of the endpoint EP1 of the USB device 10 from the endpoint management unit 110 via the path A, and then obtains transfer information corresponding to the endpoint EP1 from the transfer management unit 120 via the path B. Next, in time period T2, the schedule management unit 130 of the USB host device 100 provides a packet EP1_PKT to the endpoint EP1 of the USB device 10 via the path C, and then the endpoint EP1 of the USB device 10 provides a response EP1_RESP to the schedule management unit 130 of the USB host device 100 via the path D. Next, in time period T3, the schedule management unit 130 updates the transfer information corresponding to the endpoint EP1 to the transfer management unit 120 according to the response EP1_RESP via the path E, and then the schedule management unit 130 updates the status of the endpoint EP1 of the USB device 10 to the endpoint management unit 110 via the path F. Thus, the procedure of the endpoint EP1 of the USB device 10 is completed. Next, in time period T4, a procedure of the endpoint EP2 of the USB device 10 is activated, the schedule management unit 130 obtains the status of the endpoint EP2 of the USB device 10 from the endpoint management unit 110 via the path A, and then obtains transfer information corresponding to the endpoint EP2 from the transfer management unit 120 via the path B. Next, in time period T5, the schedule management unit 130 of the USB host device 100 provides a packet EP2_PKT to the endpoint EP2 of the USB device 10 via the path C, and then the endpoint EP2 of the USB device 10 provides a response EP2_RESP to the schedule management unit 130 of the USB host device 100 via the path D. Next, in time period T6, the schedule management unit 130 updates the transfer information corresponding to the endpoint EP2 to the transfer management unit 120 according to the response EP2_RESP via the path E, and then the schedule management unit 130 updates the status of the endpoint EP2 of the USB device 10 to the endpoint management unit 110 via the path F. Thus, the procedure of the endpoint EP2 of the USB device 10 is completed. In FIG. 2, the procedures of the endpoints EP1 and EP2 are performed in sequence; thereby a large latency may exist between the procedures of the endpoints EP1 and EP2.

Figure 3:
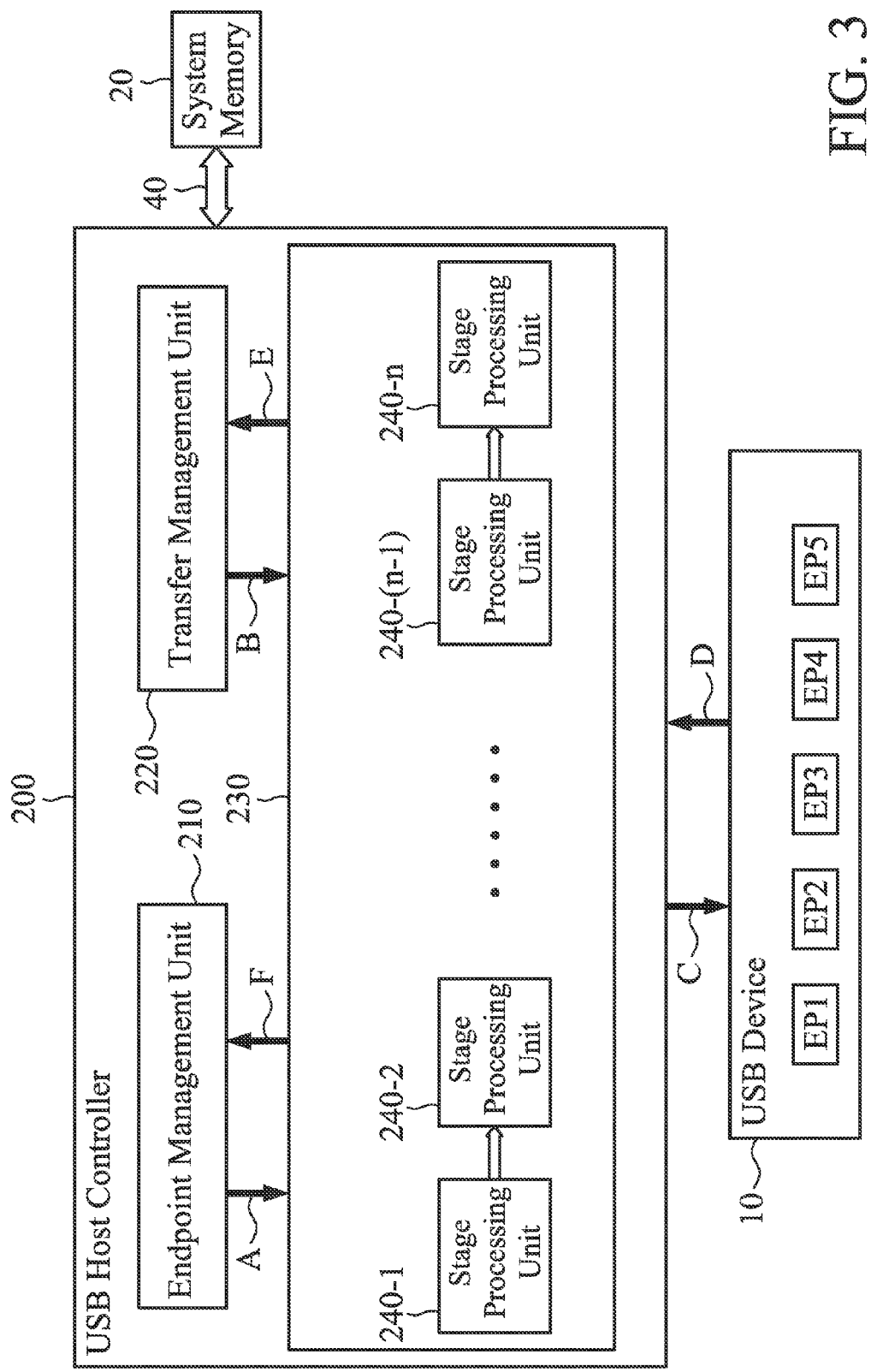
FIG. 3 shows a USB host controller according to an embodiment of the invention.

FIG. 3 shows a USB host controller 200 according to an embodiment of the invention. The USB host controller 200 comprises an endpoint management unit 210, a transfer management unit 220 and a schedule management unit 230. The endpoint management unit 210 is used to manage endpoint configurations of the USB device 10, wherein the endpoint configurations comprise a plurality of statuses of the endpoints EP1-EP5 of the USB device 10. The transfer management unit 220 is used to transfer data regarding transfer information of the endpoints EP1-EP5 of the USB device 10 between the system memory 20 and the USB host controller 200. In the USB device 10, each of the endpoints EP1-EP5 may perform individual operations. For example, an OUT operation is performed for the endpoint EP1, and an IN operation is performed for the endpoint EP2. The schedule management unit 230 comprises a plurality stage processing units 240_1-240_n for performing the procedures of the endpoints EP1-EP5 of the USB device 10 in parallel, wherein each of the stage processing units 240_1-240_n is used to manage the operations of at least one of the paths A, B, C, D, E and F for the endpoints EP1-EP5 of the USB device 10.

Figure 4:
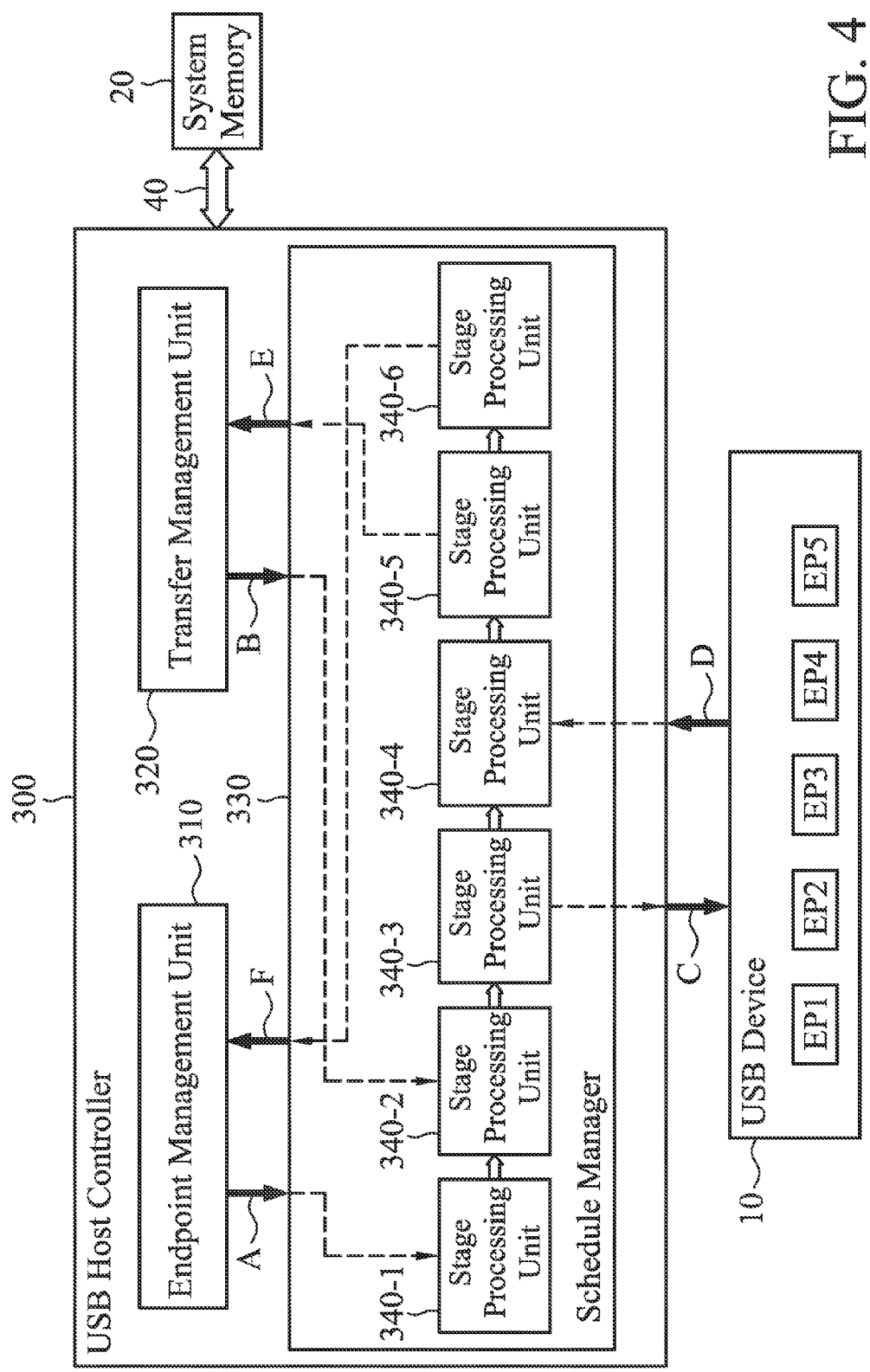
FIG. 4 shows a USB host controller according to an embodiment of the invention.
Figure 5A:
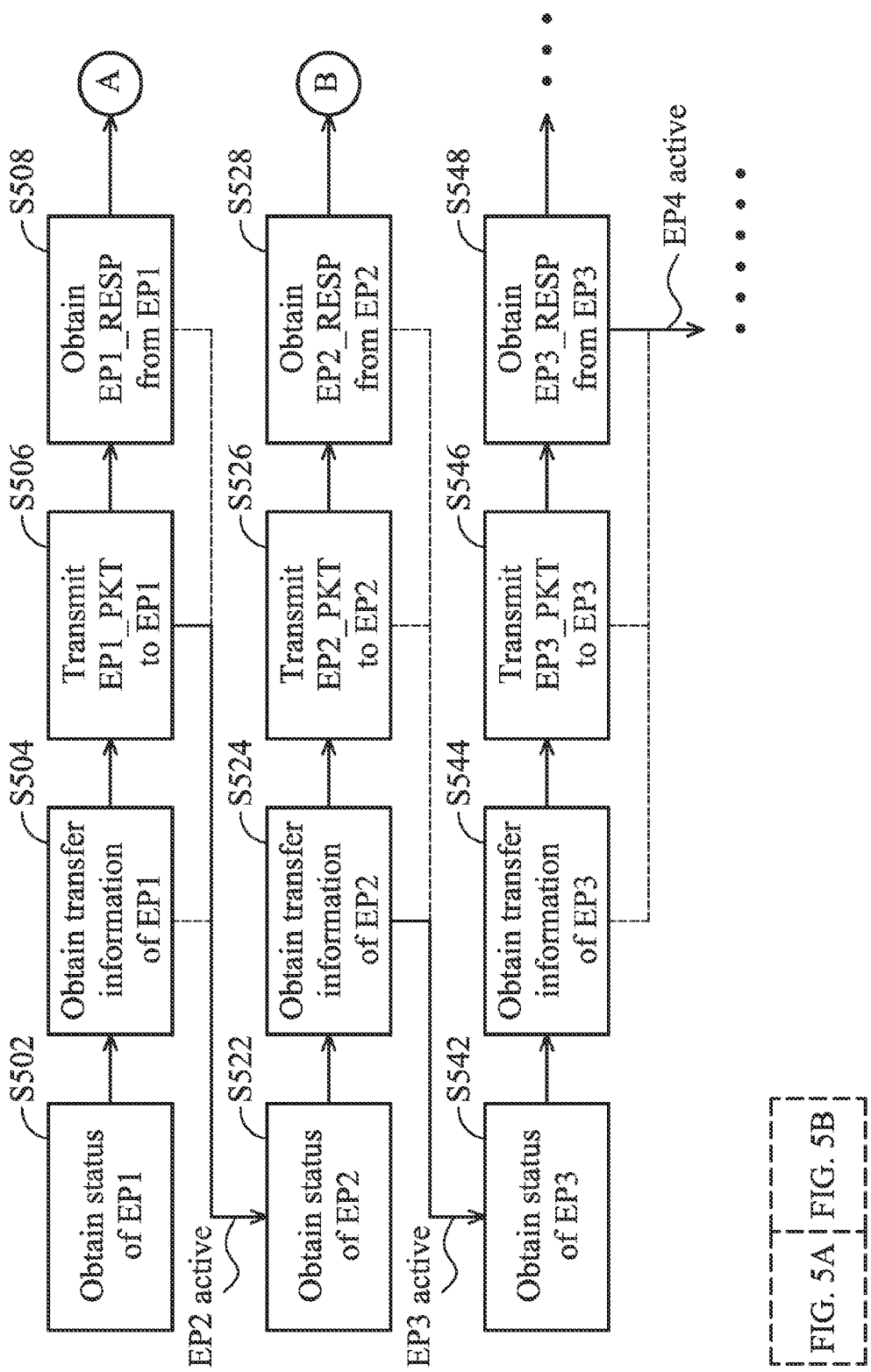
FIGS. 5A and 5B show a flowchart illustrating a scheduling method for the USB host controller of FIG. 4 according to an embodiment of the invention.
Figure 5B:
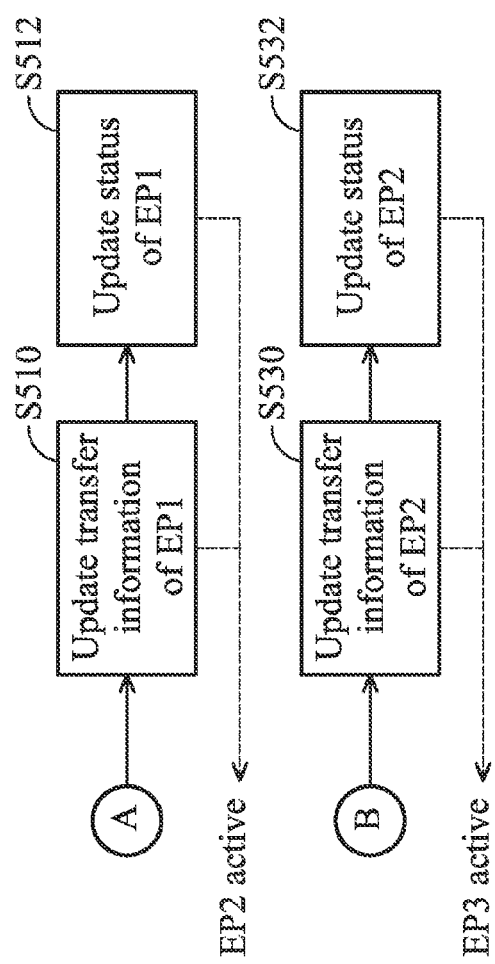

FIG. 4 shows a USB host controller 300 according to an embodiment of the invention. The USB host controller 300 comprises an endpoint management unit 310, a transfer management unit 320, and a schedule management unit 330, wherein the schedule management unit 330 comprises six stage processing units 340_1 to 340_6 for managing the operations of the paths A, B, C, D, E and F, respectively. FIGS. 5A and 5B show a flowchart illustrating a scheduling method for the USB host controller 300 of FIG. 4 according to an embodiment of the invention. According to the scheduling method, the scheduling flow of the schedule management unit 330 can be divided into several sub-procedures, and the stage processing units 340_1 to 340_6 of the schedule management unit 330 are responsible to handle each sub-procedure in the pipeline. Referring to FIGS. 4 and 5, first, in step S502, a procedure of the endpoint EP1 is activated and the stage processing unit 340_1 obtains the status (e.g. 16-byte endpoint content) of the endpoint EP1 of the USB device 10 from the endpoint management unit 310. Next, in step S504, the stage processing unit 340_2 obtains transfer information (e.g. 16-byte queue descriptor and 1024-byte data content) of the endpoint EP1 of the USB device 10 from the transfer management unit 320 in response to the status of the endpoint EP1. Next, in step S506, the stage processing unit 340_3 transmits a packet EP1_PKT to the endpoint EP1 of the USB device 10 according to the transfer information of the endpoint EP1. Next, in step S508, the stage processing unit 340_4 obtains a response EP1_RESP from the endpoint EP1 of the USB device 10, wherein the endpoint EP1 of the USB device 10 provides the response EP1_RESP to the stage processing unit 340_4 according to the received packet EP1_PKT. Next, in step S510, the stage processing unit 340_5 updates the transfer information of the endpoint EP1 of the USB device to the transfer management unit 320 according to the response EP1_RESP from the USB device 10. Next, in step S512, the stage processing unit 340_6 updates the status of the endpoint EP1 of the USB device to the endpoint management unit 310 in response to the updated transfer information. Thus, the procedure of the endpoint EP1 is completed. Furthermore, when a procedure of the endpoint EP2 is activated, the stage processing unit 340_1 obtains the status of the endpoint EP2 of the USB device 10 from the endpoint management unit 310 (step S522). In the embodiment, the procedure of the endpoint EP2 is activated when the packet EP1_PKT is transmitted to the endpoint EP1 of the USB device 10 (step S506). It is to be noted that, the procedure of the endpoint EP2 activated in step S506 is used as an example, and the procedure of the endpoint EP2 can be activated at any time that after the procedure of the endpoint EP1 has be activated (i.e. step S502), as shown in dotted lines. In the schedule management unit 330, the stage processing unit 340_1 is capable of processing the obtained status of the endpoint EP2 after step S502, thereby the procedures of the various endpoints can be performed in pipelining. Furthermore, in step S524, the stage processing unit 340_2 obtains the transfer information of the endpoint EP2 of the USB device 10 from the transfer management unit 320 in response to the status of the endpoint EP2. Next, in step S526, the stage processing unit 340_3 transmits a packet EP2_PKT to the endpoint EP2 of the USB device 10 according to the transfer information of the endpoint EP2. Next, in step S528, the stage processing unit 340_4 obtains a response EP2_RESP from the endpoint EP2 of the USB device 10 in response to the packet EP2_PKT. Next, in step S530, the stage processing unit 340_5 updates the transfer information of the endpoint EP2 of the USB device to the transfer management unit 320 according to the response EP2_RESP from the USB device 10. Next, in step S532, the stage processing unit 340_6 updates the status of the endpoint EP2 of the USB device to the endpoint management unit 310 in response to the updated transfer information. Thus, the procedure of the endpoint EP2 is completed. Similarly, when a procedure of the endpoint EP3 is activated, the stage processing unit 340_1 obtains the status of the endpoint EP3 of the USB device 10 from the endpoint management unit 310 (step S542). In the embodiment, the procedure of the endpoint EP3 is activated when the transfer information of the endpoint EP2 is obtained (step S524). It is to be noted that, the procedure of the endpoint EP3 activated in step S524 is used as an example, and the procedure of the endpoint EP3 can be activated at any time that after the procedure of the endpoint EP2 has be activated (i.e. step S522), as shown in dotted lines. In the schedule management unit 330, the stage processing unit 340_1 is capable of processing the obtained status of the endpoint EP3 after step S522, thereby the procedures of various endpoints can be performed in pipelining. Furthermore, in step S544, the stage processing unit 340_2 obtains transfer information of the endpoint EP3 of the USB device 10 from the transfer management unit 320 in response to the status of the endpoint EP3. Next, in step S546, the stage processing unit 340_3 transmits a packet EP3_PKT to the endpoint EP3 of the USB device 10 according to the transfer information of the endpoint EP3, and a procedure of the next endpoint is activated, and so on. Therefore, by using the stage processing units 340_1 to 340_6, the schedule management unit 330 may perform various procedures of the endpoints EP1-EP5 of the USB device 10 simultaneously. It is to be noted that the schedule management unit 330 comprising six stage processing units 340_1-340_6 is used as an example, and does not limit the invention.

Figure 6:
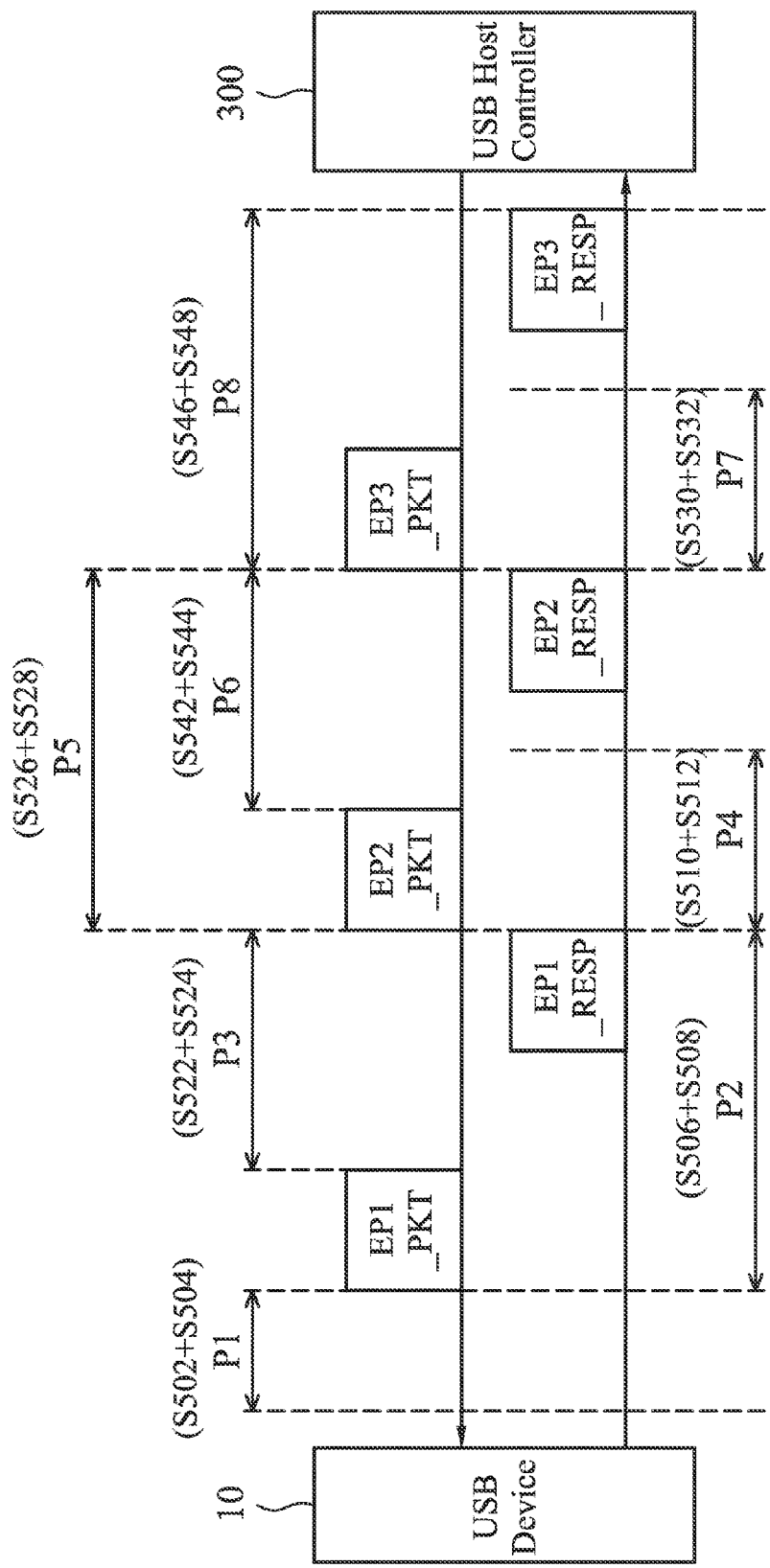
FIG. 6 shows a schematic illustrating data transfer between the USB host controller and the USB device of FIG. 4 according to the scheduling method of FIGS. 5A and 5B.

FIG. 6 shows a schematic illustrating data transfer between the USB host controller 300 and the USB device 10 of FIG. 4 according to the scheduling method of FIGS. 5A and 5B. In FIG. 6, the USB host controller 300 and the USB device 10 establish a USB 3.0 communication, wherein the USB host controller 300 transmits the packets to the USB device 10 via a pair of transmitter differential signals SSTX+/SSTX−, and the USB host controller 300 receives the responses from the USB device 10 via a pair of receiver differential signals SSRX+/SSRX−. Referring to FIGS. 5A and 5B and FIG. 6 together, in time period P1, the procedure of the endpoint EP1 of the USB device 10 is activated, and step S502 and step S504 are performed. In time period P2, step S506 is performed to provide the packet EP1_PKT from the USB host controller 300 to the USB device 10, and then the USB device 10 provides the response EP1_RESP to the USB host device 300 (step S508). After the packet EP1_PKT is transmitted to the USB device 10, step S522 and step S524 are performed for the endpoint EP2 of the USB device 10 in time period P3. After the response EP1_RESP is received, step S510 and step S512 are performed for the endpoint EP1 in time period P4. In time period P5, step S526 is performed to provide the packet EP2_PKT from the USB host controller 300 to the USB device 10, and then the USB device 10 provides the response EP2_RESP to the USB host device 300 (step S528). After the packet EP2_PKT is transmitted to the USB device 10, step S542 and step S544 are performed for the endpoint EP3 of the USB device 10 in time period P6. After the response EP2_RESP is received, step S530 and step S532 are performed for the endpoint EP2 in time period P7. In time period P8, step S546 is performed to provide the packet EP3_PKT from the USB host controller 300 to the USB device 10, and then the USB device 10 provides the response EP3_RESP to the USB host device 300. Therefore, various procedures of the endpoints EP1, EP2 and EP3 are handled in the schedule management unit 330 at the same time. Compared with the conventional data transfer of FIG. 2, the latency between the procedures of the various endpoints is decreased in FIG. 6, and the USB bus bandwidth between the USB device 10 and the USB host controller 300 can be utilized more efficiently. Similarly, the scheduling method of FIGS. 5A and 5B can be used in a USB 2.0 communication, wherein a USB host controller and a USB device transmits the packets and responses via a pair of differential signals D+/D−.

Figure 7:
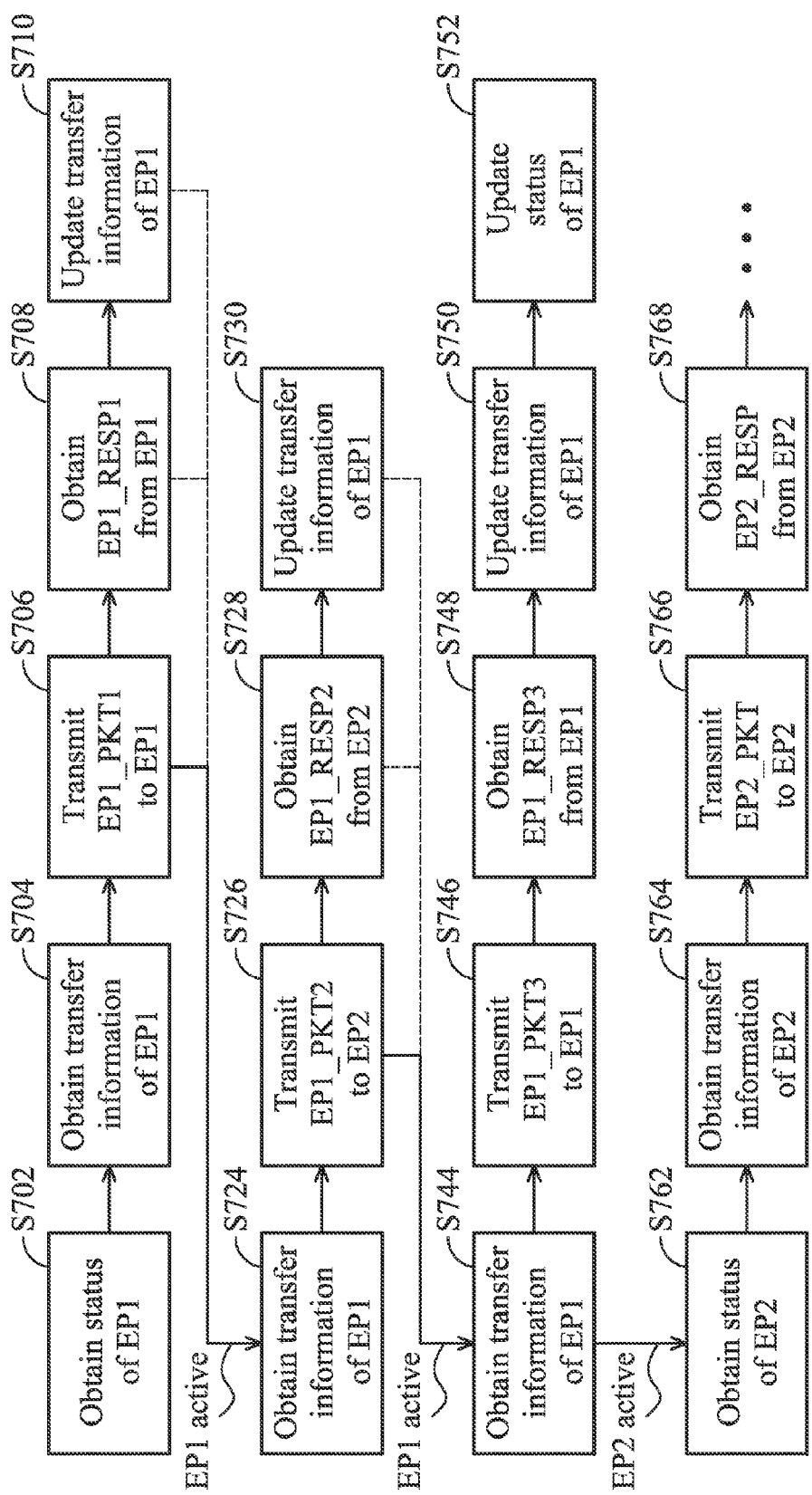
FIG. 7 shows a flowchart illustrating a scheduling method for the USB host controller of FIG. 4 according to another embodiment of the invention.

FIG. 7 shows a flowchart illustrating a scheduling method for the USB host controller 300 of FIG. 4 according to another embodiment of the invention. Referring to FIGS. 4 and 7, first, in step S702, a procedure of the endpoint EP1 is activated and the stage processing unit 340_1 obtains the status (e.g. 16-byte endpoint content) of the endpoint EP1 of the USB device 10 from the endpoint management unit 310. Next, in step S704, the stage processing unit 340_2 obtains transfer information (e.g. 16-byte queue descriptor and 1024-byte data content) of the endpoint EP1 of the USB device 10 from the transfer management unit 320 in response to the status of the endpoint EP1. Next, in step S706, the stage processing unit 340_3 transmits a packet EP1_PKT1 to the endpoint EP1 of the USB device 10 according to the transfer information of the endpoint EP1 obtained in step S704, and the next procedure of the endpoint EP1 is activated. It is to be noted that, the next procedure of the endpoint EP1 activated in step S706 is used as an example, and the next procedure of the endpoint EP1 can be activated at any time that after the transfer information of the current procedure of the endpoint EP1 is obtained by the stage processing unit 340_2 (i.e. step S704), as shown in dotted lines. In the schedule management unit 330, the stage processing unit 340_2 is capable of processing the obtained transfer information of the next procedure of the endpoint EP2 after step S704, thereby various procedures of the endpoint EP1 can be performed in pipelining. Next, in step S708, the stage processing unit 340_4 obtains a response EP1_RESP1 from the endpoint EP1 of the USB device 10, wherein the endpoint EP1 of the USB device 10 provides the response EP1_RESP1 to the stage processing unit 340_4 according to the received packet EP1_PKT1. Next, in step S710, the stage processing unit 340_5 updates the transfer information of the endpoint EP1 of the USB device to the transfer management unit 320 according to the response EP1_RESP1 from the USB device 10. Thus, the first procedure of the endpoint EP1 is completed. Furthermore, when the next procedure of the endpoint EP1 is activated, the stage processing unit 340_2 obtains the transfer information of the endpoint EP1 of the USB device 10 from the transfer management unit 320 in response to the status of the endpoint EP1 (step S724). Next, in step S726, the stage processing unit 340_3 transmits a packet EP1_PKT2 to the endpoint EP1 of the USB device 10 according to the transfer information of the endpoint EP1 obtained in step S724, and the last procedure of the endpoint EP1 is activated. As described above, the last procedure of the endpoint EP1 can be activated at any time that after step S724, thereby various procedures of the endpoint EP1 can be performed in pipelining. Next, in step S728, the stage processing unit 340_4 obtains a response EP1_RESP2 from the endpoint EP1 of the USB device 10 in response to the packet EP1_PKT2. Next, in step S730, the stage processing unit 340_5 updates the transfer information of the endpoint EP1 of the USB device to the transfer management unit 320 according to the response EP1_RESP2 from the USB device 10. Thus, the next procedure of the endpoint EP1 is completed. Moreover, when the last procedure of the endpoint EP1 is activated, the stage processing unit 340_2 obtains the transfer information of the endpoint EP1 of the USB device 10 from the transfer management unit 320 in response to the status of the endpoint EP1 and a procedure of the endpoint EP2 is activated (step S744). Next, in step S746, the stage processing unit 340_3 transmits a packet EP1_PKT3 to the endpoint EP1 of the USB device 10 according to the transfer information of the endpoint EP1 obtained in step S744. Next, in step S748, the stage processing unit 340_4 obtains a response EP1_RESP3 from the endpoint EP1 of the USB device 10, wherein the endpoint EP1 of the USB device 10 provides the response EP1_RESP3 to the stage processing unit 340_4 according to the received packet EP1_PKT3. Next, in step S750, the stage processing unit 340_5 updates the transfer information of the endpoint EP1 of the USB device to the transfer management unit 320 according to the response EP1_RESP3 from the USB device 10. Next, in step S752, the stage processing unit 340_6 updates the status of the endpoint EP1 of the USB device to the endpoint management unit 310 in response to the transfer information updated in step S750. Thus, the last procedure of the endpoint EP1 is completed. Furthermore, when the procedure of the endpoint EP2 is activated, the stage processing unit 340_1 obtains the status of the endpoint EP2 of the USB device 10 from the endpoint management unit 310 (step S762). Next, in step S764, the stage processing unit 340_2 obtains the transfer information of the endpoint EP2 of the USB device 10 from the transfer management unit 320 in response to the status of the endpoint EP2. Next, in step S766, the stage processing unit 340_3 transmits a packet EP2_PKT to the endpoint EP2 of the USB device 10 according to the transfer information of the endpoint EP2, and a procedure of the next endpoint may be activated. Next, in step S768, the stage processing unit 340_4 obtains a response EP2_RESP from the endpoint EP2 of the USB device 10 in response to the packet EP2_PKT, and so on. Therefore, by using the stage processing units 340_1 to 340_6, the schedule management unit 330 may perform various procedures of an endpoint with multiple packets and various endpoints of the USB device 10 simultaneously.

Figure 8A:
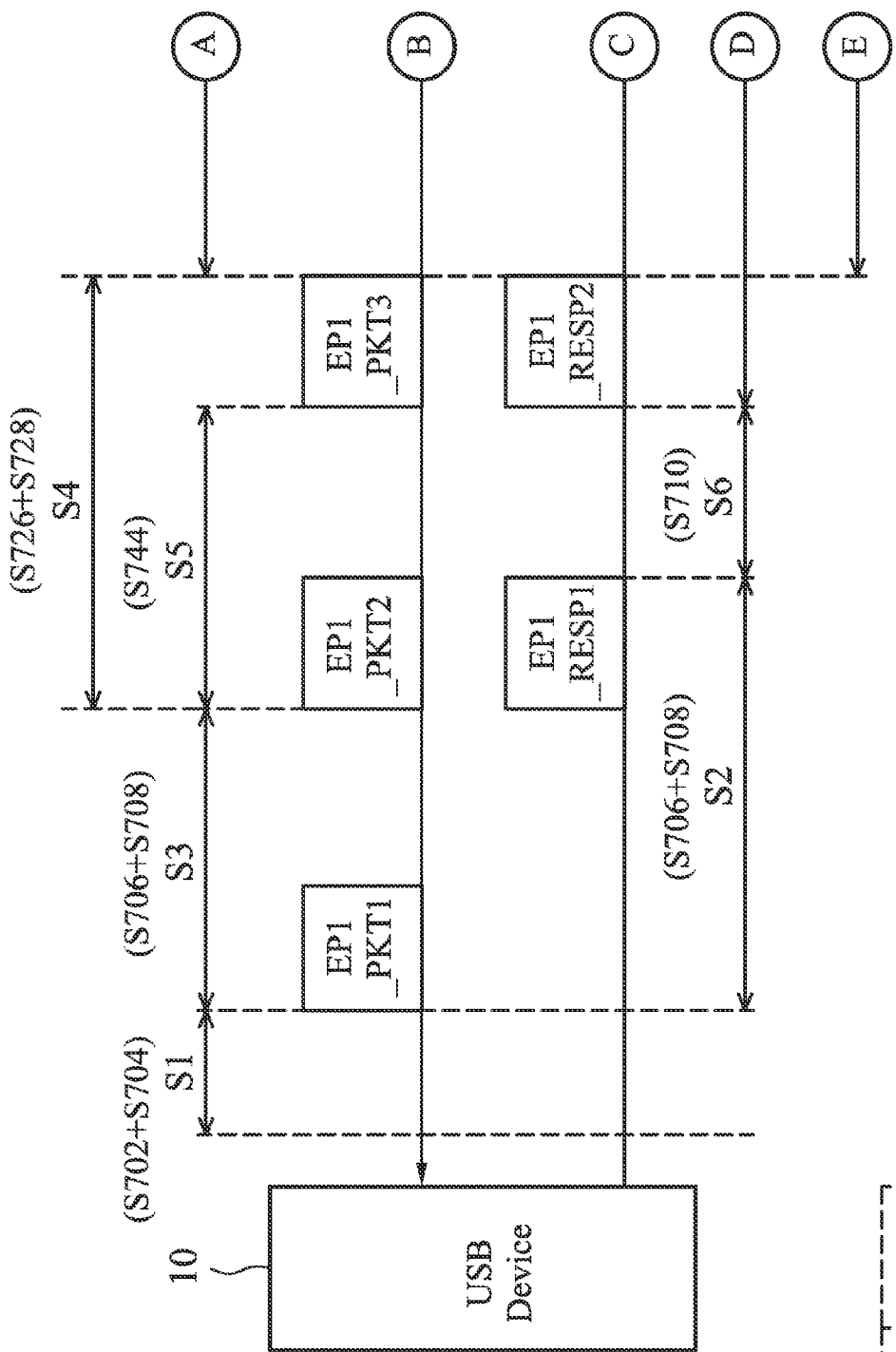
FIGS. 8A and 8B show a schematic illustrating data transfer between the USB host controller and the USB device of FIG. 4 according to the scheduling method of FIG. 7.
Figure 8B:
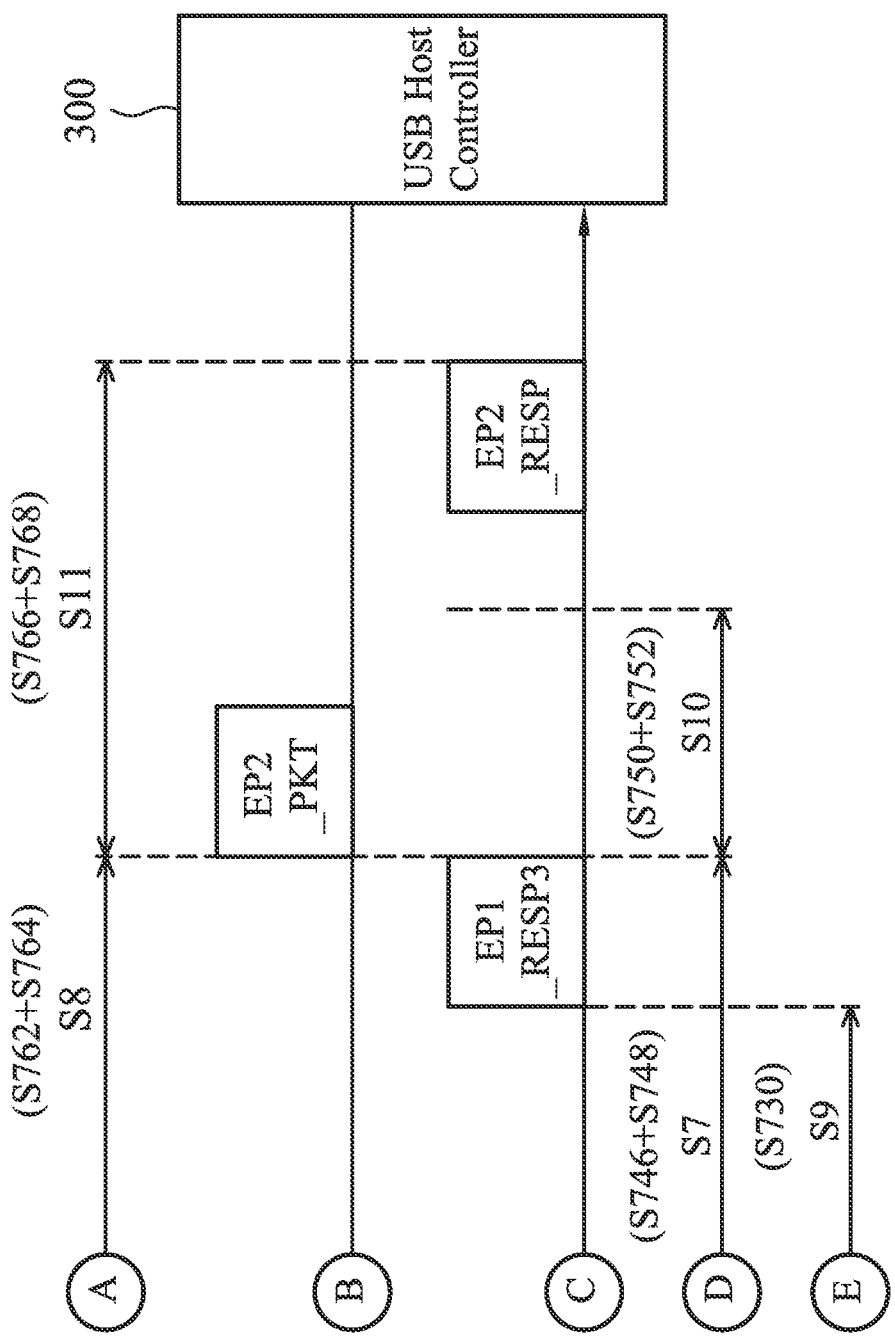

FIGS. 8A and 8B show a schematic diagram illustrating data transfer between the USB host controller 300 and the USB device 10 of FIG. 4 according to the scheduling method of FIG. 7. In FIGS. 8A and 8B, the USB host controller 300 and the USB device 10 establish a USB 3.0 communication, wherein the USB host controller 300 transmits the packets to the USB device 10 via a pair of transmitter differential signals SSTX+/SSTX−, and the USB host controller 300 receives the responses from the USB device 10 via a pair of receiver differential signals SSRX+/SSRX−. Referring to FIG. 7 and FIG. 8A together, in time period S1, the procedure of the endpoint EP1 of the USB device 10 is activated, and step S702 and step S704 are performed. In time period S2, step S706 is performed to provide the packet EP1_PKT1 from the USB host controller 300 to the USB device 10, and then the USB device 10 provides the response EP1_RESP1 to the USB host device 300 (step S708). After the response EP1_RESP1 is received, step S710 is performed for the endpoint EP1 in time period S6. When the packet EP1_PKT1 is transmitted to the USB device 10, step S724 is performed for the endpoint EP1 of the USB device 10 in time period S3. In time period S4, step S726 is performed to provide the packet EP1_PKT2 from the USB host controller 300 to the USB device 10, and then the USB device 10 provides the response EP1_RESP2 to the USB host device 300 (step S728). In FIG. 8B, after the response EP1_RESP2 is received, step S730 is performed for the endpoint EP1 in time period S9. In time period S5, step S744 is performed. In time period S7, step S746 is performed to provide the packet EP1_PKT3 from the USB host controller 300 to the USB device 10, and then the USB device 10 provides the response EP1_RESP3 to the USB host device 300 (step S748). After the response EP1_RESP3 is received, step S750 and step S752 are performed for the endpoint EP1 in time period S10. After the packet EP1_PKT3 is transmitted to the USB device 10, step S762 and step S764 are performed for the endpoint EP2 of the USB device 10 in time period S8. In time period S11, step S766 is performed to provide the packet EP2_PKT from the USB host controller 300 to the USB device 10, and then the USB device 10 provides the response EP2_RESP to the USB host device 300 (step S768). Therefore, various packets of the endpoint EP1 and various procedures of the endpoints EP1 and EP2 are handled in the schedule management unit 330 at the same time. Similarly, the scheduling method of FIGS. 5A and 5B can be used in a USB 2.0 communication, wherein a USB host controller and a USB device transmits the packets and responses via a pair of differential signals D+/D−.

While the invention has been described by way of example and in terms of the preferred embodiments, it is to be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed:
1. A USB host controller, comprising:
an endpoint management unit, managing endpoint configurations of a USB device, wherein the USB device comprises a plurality of endpoints and the endpoint configurations comprise a plurality of statuses of the endpoints of the USB device;

a transfer management unit, transferring data regarding transfer information of the endpoints of the USB device between a system memory and the USB host controller; and a schedule management unit, simultaneously managing packet transfer of at least two endpoints of the USB device, wherein the schedule management unit comprises a plurality of stage processing units for obtaining status or transfer information of the endpoints of the USB device, and transmitting or receiving a packet from the endpoints of the USB device, wherein the transfer information comprises a queue descriptor, and the packet comprises a Data Packet Header (DPH) and a Data Packet Payload (DPP).

2. The USB host controller of claim 1, wherein the plurality of stage processing units comprise:

a first-stage processing unit, obtaining status of a first endpoint of the USB device from the endpoint management unit;

a second-stage processing unit, obtaining transfer information of the first endpoint of the USB device from the transfer management unit according to the status of the first endpoint of the USB device;

a third-stage processing unit, transmitting a first packet to the first endpoint of the USB device according to the transfer information of the first endpoint of the USB device; and a fourth-stage processing unit, obtaining a first response from the first endpoint of the USB device in response to the first packet, wherein after the first packet is transmitted to the first endpoint of the USB device by the third-stage processing unit, the first-stage processing unit obtains status of a second endpoint of the USB device from the endpoint management unit, so as to obtain transfer information of the second endpoint of the USB device from the transfer management unit by the second-stage processing unit according to the status of the second endpoint of the USB device.

3. The USB host controller of claim 2, wherein the schedule management unit further comprises:

a fifth-stage processing unit, updating the transfer information of the first endpoint of the USB device to the transfer management unit according to the first response from the first endpoint of the USB device; and a sixth-stage processing unit, updating the status of the first endpoint of the USB device to the endpoint management unit according to the updated transfer information of the first endpoint of the USB device.

4. The USB host controller of claim 3, wherein when the transfer information of the first endpoint of the USB device is updated by the fifth-stage processing unit, the third-stage processing unit transmits a second packet to the second endpoint of the USB device according to the transfer information of the second endpoint of the USB device, so as to obtain a second response from the second endpoint of the USB device by the fourth-stage processing unit in response to the second packet.

5. The USB host controller of claim 4, wherein when the second packet is transmitted to the second endpoint of the USB device by the third-stage processing unit, the first-stage processing unit obtains status of a third endpoint of the USB device from the endpoint management unit, so as to obtain transfer information of the third endpoint of the USB device from the transfer management unit by the second-stage processing unit according to the status of the third endpoint of the USB device.

6. The USB host controller of claim 1, wherein the plurality of stage processing units comprise:

a first-stage processing unit, obtaining status of a first endpoint of the USB device from the endpoint management unit;

a second-stage processing unit, obtaining first transfer information of the first endpoint of the USB device from the transfer management unit according to the status of the first endpoint of the USB device;

a third-stage processing unit, transmitting a first packet to the first endpoint of the USB device according to the first transfer information of the first endpoint of the USB device; and a fourth-stage processing unit, obtaining a first response from the first endpoint of the USB device in response to the first packet, wherein when the first packet is transmitted to the first endpoint of the USB device by the third-stage processing unit, the second-stage processing unit obtains second transfer information of the first endpoint of the USB device from the transfer management unit according to the status of the first endpoint of the USB device.

7. The USB host controller of claim 6, wherein when the first response from the first endpoint of the USB device is obtained by the fourth-stage processing unit, the third-stage processing unit transmits a second packet to the first endpoint of the USB device according to the second transfer information of the first endpoint of the USB device.

8. The USB host controller of claim 7, wherein when the second packet is transmitted to the first endpoint of the USB device by the third-stage processing unit, the second-stage processing unit obtains third transfer information of the first endpoint of the USB device from the transfer management unit according to the status of the first endpoint of the USB device, and when the fourth-stage processing unit obtains a second response from the first endpoint of the USB device in response to the second packet, the third-stage processing unit transmits a third packet to the first endpoint of the USB device according to the third transfer information of the first endpoint of the USB device.

9. The USB host controller of claim 8, wherein when the third transfer information of the first endpoint of the USB device is obtained by the second-stage processing unit, the first-stage processing unit obtains status of a second endpoint of the USB device from the endpoint management unit, so as to obtain transfer information of the second endpoint of the USB device from the transfer management unit by the second-stage processing unit according to the status of the second endpoint of the USB device.

10. The USB host controller of claim 9, wherein after the fourth-stage processing unit obtains a third response from the first endpoint of the USB device in response to the third packet, the third-stage processing unit transmits a fourth packet to the second endpoint of the USB device according to the transfer information of the second endpoint of the USB device.

11. The USB host controller of claim 10, wherein the schedule management unit further comprises:

a fifth-stage processing unit, updating the first, second and third transfer information of the first endpoint of the USB device to the transfer management unit according to the first, second and third responses from the first endpoint of the USB device, respectively; and a sixth-stage processing unit, updating the status of the first endpoint of the USB device to the endpoint management unit according to the updated third transfer information.

12. A scheduling method for a USB host controller, wherein the USB host controller is coupled to a USB device comprising a plurality of endpoints, comprising:
managing packet transfer of the endpoints of the USB device by a schedule management unit, wherein the step of managing the packet transfer of each endpoint of the USB device comprises six stages:
obtaining status of one of the endpoints of the USB device;
obtaining transfer information of the one of the endpoints of the USB device, wherein the transfer information comprises a queue descriptor;
transmitting a packet to the one of the endpoints of the USB device, wherein the packet comprises a Data Packet Header (DPH) and a Data Packet Payload (DPP);
obtaining a response from the one of the endpoints of the USB device;
updating the transfer information of the one of the endpoints of the USB device; and
updating the status of the one of the endpoints of the USB device,
wherein at least two stages of the six stages are simultaneously performed for different endpoints of the USB device.

13. The scheduling method of claim 12, wherein the status of the one of the endpoints is obtained when the one of the endpoints of the USB device is activated, and the transfer information of the one of the endpoints of the USB device is obtained according to the status of the one of the endpoints.

14. The scheduling method of claim 12, wherein the packet is transmitted to the one of the endpoints of the USB device according to the transfer information of the one of the endpoints, and the one of the endpoints of the USB device provides the response to the USB host controller in response to the packet.

15. The scheduling method of claim 12, wherein the transfer information of the one of the endpoints of the USB device is updated according to the response from the one of the endpoints of the USB device, and the status of the one of the endpoints of the USB device is updated according to the update transfer information of the one of the endpoints of the USB device.

16. The scheduling method of claim 12, wherein at least two stages of the six stages corresponding to different endpoints are simultaneously performed.

17. A scheduling method for a USB host controller, wherein the USB host controller is coupled to a USB device comprising a plurality of endpoints, comprising:
managing packet transfer of the endpoints of the USB device by a schedule management unit, wherein the step of managing the packet transfer of each endpoint of the USB device comprises six stages:
obtaining status of the corresponding endpoint of the USB device;
obtaining transfer information of the corresponding endpoint of the USB device, wherein the transfer information comprises a queue descriptor;
transmitting a packet to the corresponding endpoint of the USB device, wherein the packet comprises a Data Packet Header (DPH) and a Data Packet Payload (DPP);
obtaining a response from the corresponding endpoint of the USB device;
updating the transfer information of the corresponding endpoint of the USB device; and
updating the status of the corresponding endpoint of the USB device,
wherein at least two stages of the six stages are simultaneously performed for different packets of the corresponding endpoint of the USB device.

18. The scheduling method of claim 17, wherein the status of the corresponding endpoint is obtained when the corresponding endpoint of the USB device is activated, and the transfer information of the corresponding endpoint of the USB device is obtained according to the status of the corresponding endpoint.

19. The scheduling method of claim 17, wherein the packet is transmitted to the corresponding endpoint of the USB device according to the transfer information of the corresponding endpoint, and the corresponding endpoint of the USB device provides the response to the USB host controller in response to the packet.

20. The scheduling method of claim 17, wherein the transfer information of the corresponding endpoint of the USB device is updated according to the response from the corresponding endpoint of the USB device, and the status of the corresponding endpoint of the USB device is updated according to the update transfer information of the corresponding endpoint of the USB device.

21. The scheduling method of claim 17, wherein at least two stages of the six stages corresponding to different packages of the corresponding endpoint are simultaneously performed.

* * * * *